US008665310B2

(12) United States Patent
Verthein et al.

(10) Patent No.: US 8,665,310 B2
(45) Date of Patent: Mar. 4, 2014

(54) TECHNIQUES AND SYSTEM FOR ACTIVE LIGHTING CONTROL IN VIDEO CONFERENCING

(75) Inventors: William Verthein, Redmond, WA (US); Jingyu Qiu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 13/021,341

(22) Filed: Feb. 4, 2011

(65) Prior Publication Data
US 2012/0200660 A1    Aug. 9, 2012

(51) Int. Cl.
*H04N 7/15*    (2006.01)

(52) U.S. Cl.
CPC ..................... *H04N 7/15* (2013.01)
USPC ............. 348/14.08; 348/14.09; 348/370

(58) Field of Classification Search
USPC ........... 348/14.01–14.16, 164, 234; 345/589, 345/426; 715/717; 382/100, 103
See application file for complete search history.

(56) References Cited

U.S. PATENT DOCUMENTS

| | | | |
|---|---|---|---|
| 3,294,152 A | 12/1966 | Willem | |
| 4,884,008 A | 11/1989 | Bossler et al. | |
| 2003/0103075 A1* | 6/2003 | Rosselot | 345/717 |
| 2006/0017805 A1 | 1/2006 | Rodman | |
| 2007/0029949 A1 | 2/2007 | Null et al. | |
| 2008/0258646 A1 | 10/2008 | Beij et al. | |
| 2009/0146982 A1* | 6/2009 | Thielman et al. | 345/207 |
| 2011/0153738 A1* | 6/2011 | Bedingfield | 709/204 |
| 2011/0181685 A1* | 7/2011 | Saleh et al. | 348/14.08 |
| 2011/0205240 A1* | 8/2011 | Marks et al. | 345/589 |
| 2011/0228096 A1* | 9/2011 | Friel et al. | 348/164 |
| 2012/0057050 A1* | 3/2012 | Ashdown | 348/234 |

FOREIGN PATENT DOCUMENTS

WO    WO 2010131212 A1 *  11/2010

OTHER PUBLICATIONS

"Video Conference Room Lighting Design Principles and Requirements of Light Distribution—Video Conference Rooms, Lighting—Intelligent Home Industry", Retrieved at <<http://news.frbiz.com/video_conference_room_lighting-238921.html>>, Mar. 24, 2010, pp. 3.
Shirehjini, Ali A. Nazari., "A Generic UPnP Architecture for Ambient Intelligence Meeting Rooms", Retrieved at <<http://www.soc-eusai2005.net/proceedings/articles_pagines/32_pdf_file.pdf>>, Proceedings of the 2005 joint conference on Smart objects and ambient intelligence: innovative context-aware services: usages and technologies, Oct. 2005, pp. 6.
"Dual—Relay Decora Wall Switch Occupancy Sensor", Retrieved at <<http://www.leviton.com/OA_HTML/ibcGetAttachment. jsp?cItemId=a3JMR9JIUQsiotZFY3SmtA&label=IBE &appName=IBE>>, Retrieved Date: Nov. 3, 2010, pp. 8.

* cited by examiner

*Primary Examiner* — Melur Ramakrishnaiah
(74) *Attorney, Agent, or Firm* — Sonia Cooper; Brian Haslam; Micky Minhas (57) ABSTRACT

Techniques to provide active lighting control for video teleconferencing systems are described. In an embodiment, a video teleconferencing (TVC) device receives lighting data from cameras in a room where a VTC is taking place. The VTC device may access lighting profiles for the lights in the room from a lighting control system. The VTC device may compare the current lighting conditions to a target model. The VTC device may use the lighting profiles to select lights to turn on or off via the lighting control system to improve the lighting. The VTC device may monitor the lighting conditions during the conference and may re-adjust the lights if a large change occurs. Other embodiments are described and claimed.

14 Claims, 9 Drawing Sheets

TECHNIQUES AND SYSTEM FOR ACTIVE LIGHTING CONTROL IN VIDEO CONFERENCING

BACKGROUND

Proper lighting is an important component of a high quality video teleconferencing (VTC) experience. Improper lighting, such as over- or under-exposure, glare, or overly warm or cold colors can impair a viewer's ability to interact appropriately with the other participants of the VTC, or may, at least, make the experience unpleasant. Dedicating a room for VTC, where everything in the room is fixed for one lighting solution, can be expensive and make the room unsuitable for other purposes. More mobile systems may rely on pre-existing, non-optimal room set-up and lighting. These systems may rely primarily on the participants to turn lights on or off, and close window blinds, etc. to achieve a semblance of good lighting. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to provide automated active lighting control for video teleconferencing (VTC). Some embodiments are particularly directed to an apparatus to conduct a video teleconference and to actively adjust the lighting in a conference room when a lighting parameter is sub-optimal as compared to a target model. In one embodiment, for example, an apparatus may include a processing unit, a video conferencing module to conduct the video teleconference, and a lighting optimizing module to compare the lighting data in the room to the target model. The lighting optimizing module may look up lighting profiles for each light in the room and use the profiles to calculate which light to turn on, off or dim to improve the lighting and approach the target model. The apparatus may then communicate with a lighting control system to make the calculated adjustments. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to systems and techniques for providing active lighting control for video teleconferences (VTCs). In particular, embodiments are directed to systems and techniques for active lighting control for VTCs that do not require dedicated VTC rooms where a lighting setup is fixed. In an embodiment, a video teleconference device may receive video information from one or more cameras in a room. The VTC device may also communicate with a lighting control system in order to adjust the lights in the room in order to optimize the lighting solution for a particular teleconference. The VTC device may also build a lighting profile that stores the effect that each light in the room has on the overall lighting. The lighting profile may be used to calculate which lights to adjust in order to improve factors such as exposure, contrast, warmth, and backlighting.

Figure 1:
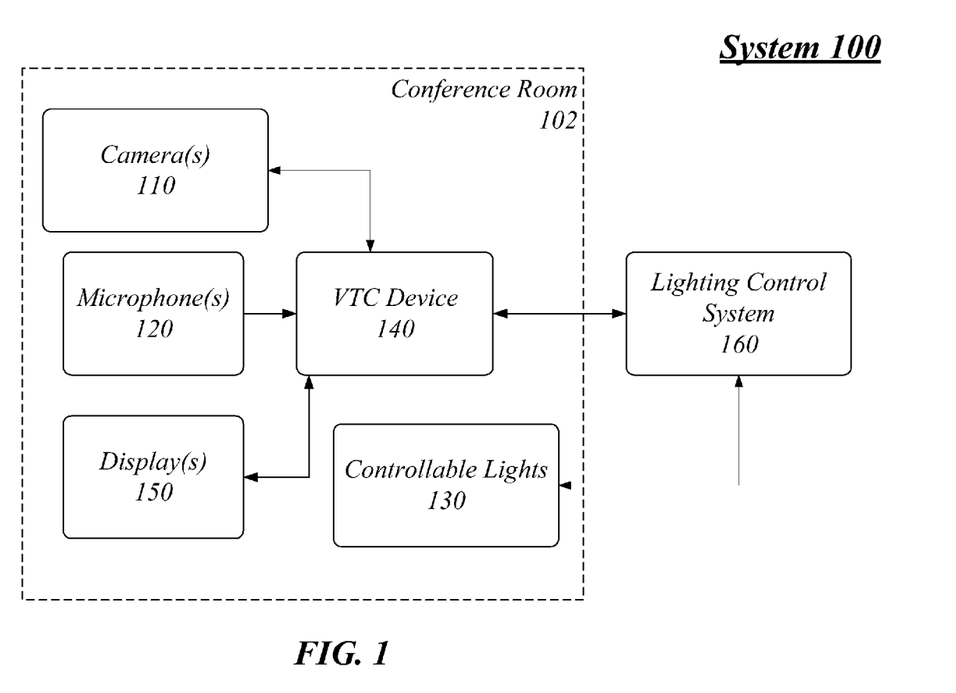
FIG. 1 illustrates an embodiment of a system for active lighting control for a video teleconference.

FIG. 1 illustrates a block diagram for a system 100 to control lighting for a video teleconference (VTC) actively. In one embodiment, for example, the system 100 may comprise a computer-implemented system 100 having one or more components, such as VTC device 140 and lighting control system 160. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components 140, 160 may be communicatively coupled via various types of communications media to each other and to cameras 110, microphones 120, controllable lights 130, and display(s) 150. The components may coordinate operations among each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may reside, in part, in a conference room 102. Conference room 102 may include one or more video cameras 110, one or more microphones 120, and one or more displays 150, as components of a video teleconferencing system. Conference room 102 may also include one or more controllable lights 130, which may be controllable by a lighting control system 160. System 100 may further include a VTC device 140, which may perform various functions such as coordinating a VTC by sending and receiving video and audio information, and displaying the information to participants in conference room 102. VTC device 140 may also actively adjust the lighting in conference room 102 by accessing lighting control system 160. Although VTC device 140 is illustrated as being in conference room 102, VTC device 140 may be in any location where it can receive data from cameras 120, microphones 130, and other VTC devices that are supporting a VTC from other locations, as well as from where it can access lighting control system 160.

System 100 may include one or more video cameras 110. Video cameras 110 may be "dumb" video cameras that record and/or transmit video to VTC device 140 of the participants in the room for a video teleconference, without any internal processing of the video images. For such video cameras, VTC device 140 may perform video processing tasks as needed.

Video cameras 110 may be "smart" video cameras that perform video processing internally, such as, but not limited to, face detection, motion detection, image stabilization, video compression and the like. Video cameras 110 may also measure lighting information such as exposure, color warmth, contrast, brightness, and backlighting. Such video cameras may transmit unprocessed and/or processed video and lighting information to VTC device 140.

System 100 may include one or more microphones 120. Microphones 120 may be integrated with video cameras 110 or may be separate therefrom. Microphones 120 may capture and transmit audio information from a participant speaking in conference room 102 to VTC device 140.

System 100 may include one or more controllable light sources 130. Controllable lights 130 may be light fixtures installed in conference room 102 that can be controlled by lighting control system 160, which may be located outside of conference room 102. Examples of controllable lights 130 may include spotlights, recessed lights, track lights, wall sconces, ceiling lights, chandelier lights and the like. Controllable lights 130 may be controlled through a wired or wireless interface with lighting control system 160.

System 100 may include a virtual teleconference (VTC) device 140. VTC device 140 may be a electronic device capable of operating a virtual teleconference, and capable of actively controlling the lighting in conference room 102 via lighting control system 160. To operate a virtual teleconference, VTC device 140 may receive video and audio information from other VTC devices participating in a conference. VTC 140 may transmit video and audio information from the participants in conference room 102 to the other VTC devices. VTC device 140 may additionally manage information about who is participating, detect an active speaker, arrange a display of the different video feeds, and other functions of a VTC.

VTC device 140 may be a portable device that can be moved from conference room to conference room as needed, reducing the need for an organization to invest in multiple VTC-supporting systems. VTC device 140 may be able to identify which room it is in. For example, VTC device may be able to identify which room it is in by system SIP address, a wireless access point in a room, or by a bar code identifying the room that can be scanned by VTC device 140 or a device in communication with VTC device 140. VTC device 140 is described in greater detail with respect to FIG. 3.

System 100 may include one or more displays 150. Display 150 may show the various video feeds from other VTC devices in the conference. In an embodiment, display 150 may also comprise speakers for the audio information. Examples of display 150 may include, for example, a projector, a computer monitor, a television screen, a liquid crystal display, a plasma display, and the like. Display 150 may receive video for display from VTC device 140.

System 100 may include, or communicate with, lighting control system 160. Lighting control system 160 may be a centralized control system for the lights in a building. Lighting control system 160 may be able to control lights in any part of a building, or group of buildings, from one location. Controlling a light may include turning the light on and off, and/or dimming and brightening a light. Lighting control system 160 may provide an interface through which outside systems, such as VTC device 140 may control some of the lights. Lighting control system 160 is described in greater detail with respect to FIG. 2.

Figure 2:
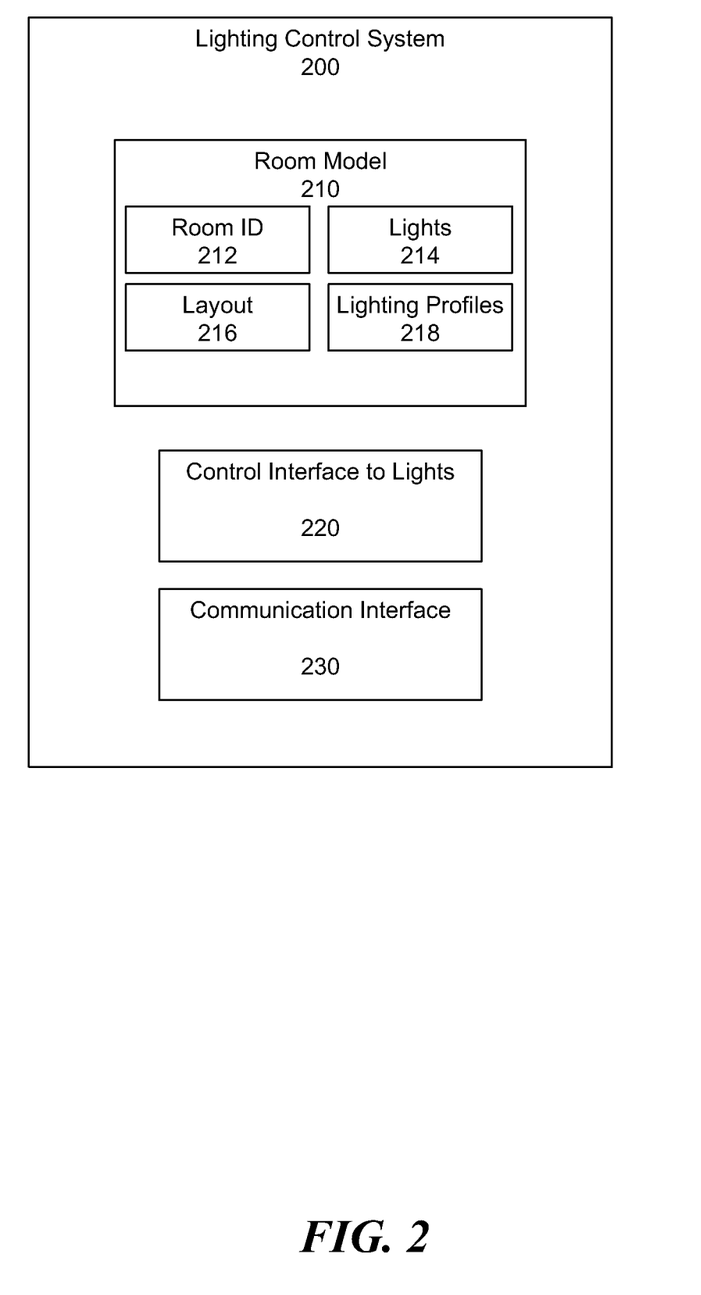
FIG. 2 illustrates a block diagram of a lighting control system according to embodiments.

FIG. 2 illustrates a block diagram of a lighting control system 200. Lighting control system 200 may be an embodiment of lighting control system 160. Lighting control system 200 may operate on one or more electronic devices. Lighting control system 200 may include one or more room models 210, a control interface 220 to lights under the control of lighting control system 200 and a communication interface 230.

Lighting control system 200 may have a room model 210 for each room under the control of lighting control system 200. A room model 210 may include a room identifier 212 to uniquely identify a room. Room ID 212 may be a unique alpha-numeric string or a unique network address for a communication port in the room. In an embodiment, room ID 212 may be represented in a scannable image, such as a bar code, and placed in the corresponding room.

Room model 210 may further include a list of lights 214 that can be controlled in the room. Lights 214 may include an identifier for each individually controllable light source in the room. Lights 214 may further include information such as an absolute or relative position of each light in the room, specifications, or other information. Lights 214 may further include a pointer or other means of access to the control interface for a particular light in control interface 220.

Room model 210 may further include a room layout 216. Layout 216 may include information about fixed elements in the room. Such information may include, for example, the dimensions of the room, and the relative or absolute placements of windows, non-controllable light sources, doors, large furniture, etc.

Room model 210 may further include lighting profiles 218. Lighting profiles 218 may include data, obtained during a calibration process, about how each light in the room affects lighting. Lighting profiles 218 may include one profile for all of the lights in the room, or separate profiles, one for each light. For a particular light, a lighting profile 218 may include information about room brightness, contrast, color warmth, backlighting and other lighting aspects for when the light is on and for when the light is off. Lighting profiles may also contain information about an area of effect for each light. The area of effect may be the portion, e.g. a volume, of the room that is detectably illuminated by the light, and may be described relative to a coordinate system in room layout 216.

Lighting control system 200 may include a control interface 220 to the lights under its control. Control interface 220 may include wired and/or wireless connections to each light under the control of lighting control system 200. These connections may be used to alter the current and/or resistance to each light source to turn them on and off, and/or to dim them. A remote device, such as VTC device 140, may use control interface 220 to turn lights off and on. Control interface 220 may also be used by lighting control system 200 for lighting control not related to VTCs, such as for turning off all lights after a certain time at night, or turning some lights on automatically in the morning.

Lighting control system 200 may include a communication interface 230. Communication interface 230 may allow lighting control system 200 to send and receive communications with devices, such as VTC device 140. Communication interface 230 may include wired and/or wireless communication interfaces. Communication interface 230 may allow computing devices, such as VTC device 140, to access room models 210 and to control lights via the control interface 220.

Figure 3:
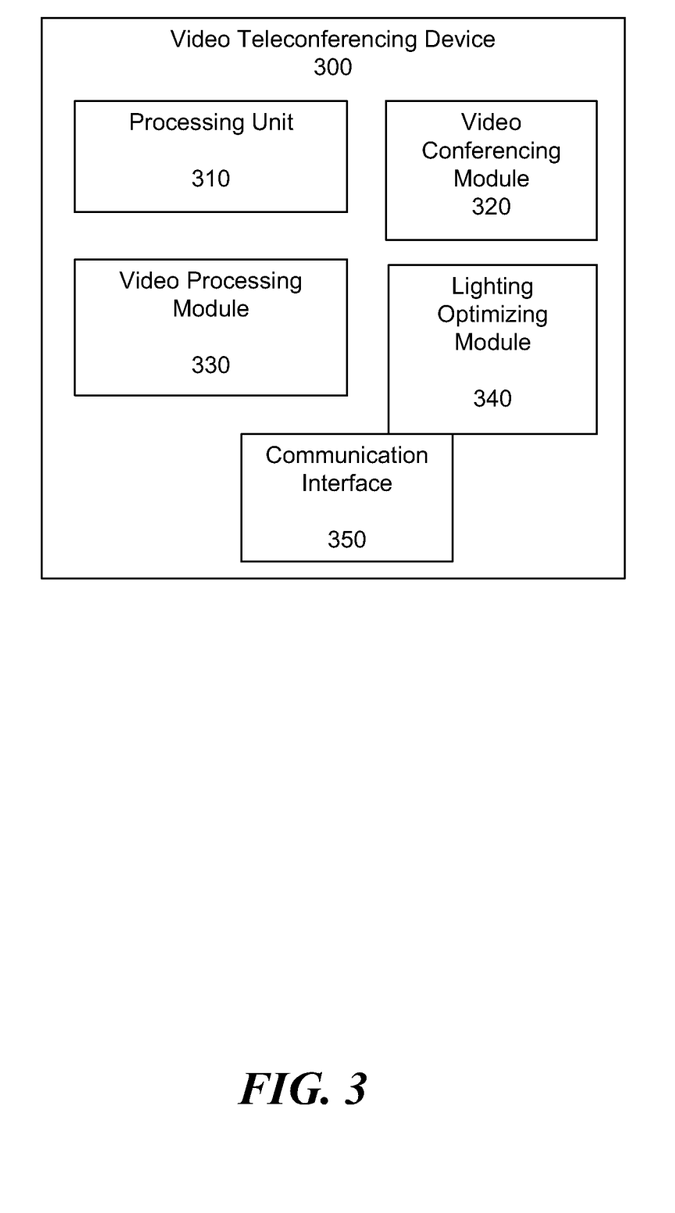
FIG. 3 illustrates a block diagram of a video teleconferencing device according to embodiments.

FIG. 3 illustrates a block diagram of an embodiment of a video teleconferencing device (VTC) 300. VTC 300 may be an example of VTC 140. VTC 300 may include one or more functional units, such as processing unit 310, video conferencing module 320, video processing module 330, lighting optimizing module 340 and/or communicating interface 350.

Processing unit 310 may include one or more logic devices, such as a general purpose central processing unit (CPU), a graphics processing unit (GPU), or other logic devices as described below with respect to FIG. 8. Processing unit 310 may execute instructions to implement the functions and processes of modules 320, 330, and 340. Processing unit 310 may also manage other operations of VTC 300, such as running an operating system, managing communications, reading and writing data, etc.

Video conferencing module (VCM) 320 may provide video conferencing functionality. VCM 320 may, for example, receive video and audio data from other VTC devices via communication interface 350. VCM 320 may send video and audio data from the conference that VTC 300 is operating to the other VTC devices, and display the received video and audio in the room. VCM 320 may, in addition, keep track of which users are participating, detect an active speaker, display a presentation, coordinate collaboration on a document, etc.

Video processing module 330 may process video received from the video cameras in the conference room. The video processing may be performed entirely by video processing module 330, or in addition to some video processing performed by the cameras. Examples of video processing may include compression, motion detection, image stabilization, and face detection.

Lighting optimizing module (LOM) 340 may operate to optimize the lighting in the conference room. LOM 340 may receive lighting information from the cameras or from video processing module 330. LOM 340 may compare the lighting information to a target model and use the lighting profiles of the lights in the conference room to adjust the lights in the room to approach the target model.

In an embodiment, LOM 340 may receive brightness, contrast, color saturation, backlighting and other lighting information about the conference room. LOM 340 may then compare the received information to a target model that include parameters such as brightness, contrast, color saturation, color warmth, etc. If the received information differs from the target model parameters by more than a specified threshold, LOM 340 may calculate the effect that each light source may have on a parameter, from the lighting profiles. LOM 340 may select the light adjustment(s) that bring the lighting closest to the target model. LOM 340 may then access the lighting control system via communication interface 350 to perform the selected light adjustments.

LOM 340 may monitor the lighting in the room periodically for the duration of the conference. If a lighting parameter changes beyond a second threshold, for example, if a window blind is opened or closed during the conference, LM 340 may readjust the lighting by again calculating the light adjustments that will bring the lighting closest to the target model.

LOM 340 may further calibrate the lights in a conference room to generate a lighting profile 218 for the lights in the conference room. In an embodiment, during calibration, LOM 340 may determine a light source's effect on the lighting parameters as specified in the target model by individually turning each light source off and on and measuring how the parameters change. LM 340 may upload the lighting profile 218 to lighting control system 200, via communication interface 350, for later use by a VTC device to control lights in that particular conference room.

Although LOM 340 is depicted as being a component of VTC device 300, in an embodiment, LOM 340 may be operative in a separate device, or even in lighting control system 160. In such an embodiment, LOM 340 may receive lighting and video data from the cameras in a conference room, and may control the lights in the conference room as described herein, based on the data received from the cameras.

VTC device 300 may also detect in which room it is, in order to access the appropriate room model in lighting control system 160, 200. VTC device 300 may receive data from an input device that scans a graphical label, such as a barcode, which is unique to the room and allows VTC device to access the room model corresponding to the graphical label. VTC device 300 may determine which room it is in according to a wireless access point (WAP), or from an SIP address when it is coupled to the network used in the building and/or by lighting control system 160, 200. Room identification may be performed, for example, by video conferencing module 320, LOM 340, or another functional module not illustrated.

Figure 4:
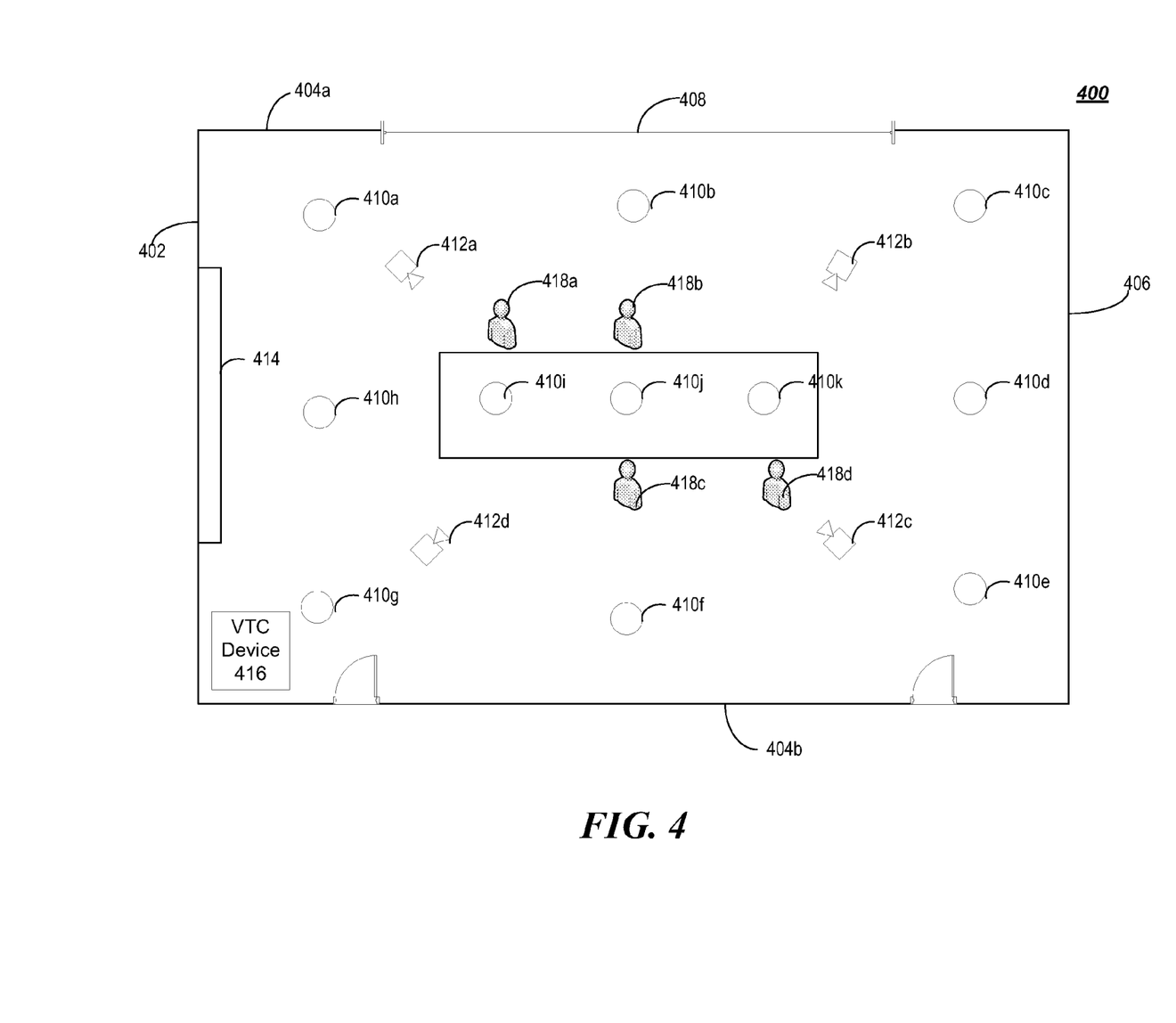
FIG. 4 illustrates an example of a conference room layout for a video teleconference according to embodiments.

FIG. 4 illustrates an example of a conference room 500 used for a video teleconference. Conference room 400 may include a front wall 402, two side walls 404a, b, and a back wall 406. Conference room 400 may also have one or more windows 408, or other sources of light that are not controllable by a lighting control system. Conference room 400 may include a number of light sources 410a-k, and one or more cameras 412a-d. Conference room 400 may include a display 414. VTC device 416 may be located in conference room 400, or may be located outside of the room but able to receive information from cameras 412. When a conference is taking place, conference room may have one or more participants 418a-d seated at a conference table 420.

At the beginning of the conference, VTC device 416 may measure the lighting conditions as seen by cameras 412. VTC device 416 may detect the faces of participants 418 and measure the lighting conditions specific to each detected face. For example, participants 418*c* and 418*d* may be well or over-lighted because they are facing window 408. Participants 418*a* and 418*b* may be under-lighted, with strong backlighting because of window 408. VTC device 416 may, for example, dim or turn off lights 410*a*, 410*b*, and 410*c*, and may turn on or brighten light 410*i*.

During the conference, if the lighting conditions change, for example at sunset, or if someone closes the blinds on window 408, VTC device 416 may adjust the lights again. If window 408 is no longer a source of light, then VTC device 416 may need to turn on lights 410*a*, 410*b*, and 410*c*. VTC device 416 may only re-adjust lights if the change is greater than some threshold. This may prevent frequent lighting changes that could be distracting or annoying for the participants in the room.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5:
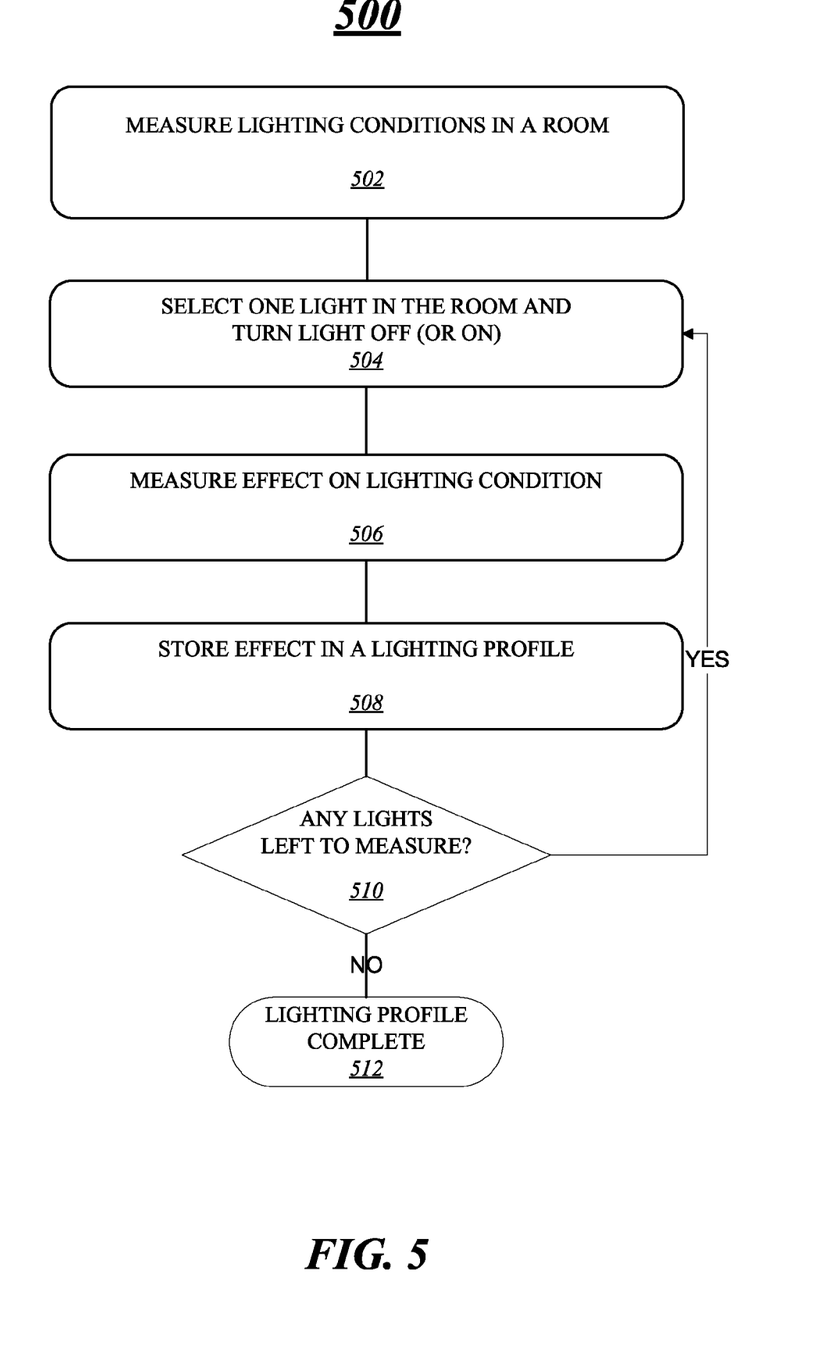
FIG. 5 illustrates an example of a calibration logic flow according to embodiments.

FIG. 5 illustrates one embodiment of a logic flow 500. Logic flow 600 may be representative of some or all of the operations executed by one or more embodiments described herein. The logic flow 600 may be representative of some or all of the operations executed by one or more embodiments described herein. In particular, logic flow 500 may calibrate lighting profiles.

Logic flow 500 may measure lighting conditions in a conference room in block 503. For example, all of the lights in the conference room may be turned on, or all turned off as an initial condition. LOM 340 may then measure the parameters of the lighting, such as brightness, contrast, etc.

Logic flow 500 may select a light in the room in block 604. The selected light may be turned off (if it was on), or on (if it was off). LOM 340 may in an order suggested by the room model for the conference room, such as from a list of lights 214, or in a sequence based on room layout 216. LOM 340 may access lighting control system 160 to turn the light on or off.

Logic flow 500 may measure the effect of the previous step on the lighting condition in the room in block 506. For example, if the initial condition is that all of the lights are off, then turning one light on will increase the brightness and contrast in one area of the room, and may affect the color, e.g. making the area more yellow. The change in parameter values between the initial condition and the change in lighting may constitute the lighting profile for that light source.

Logic flow 500 may store that measured change in a lighting profile in block 608. A lighting profile may be created for each individually controllable light source and may be stored separately at lighting control system 160, or may be combined into one logical unit, such as a database. In an embodiment, lighting profiles may be stored separately from lighting control system 160, while still being accessible to both the lighting control system and VTC device 140.

If there are lights remaining to be measured in block 610, then logic flow repeats from block 604. Otherwise, logic flow 500 ends at block 612.

The calibration illustrated in logic flow 500 may be typically performed once, before first use of the VTC system in that conference room. However, updates to the lighting profiles may be performed as needed.

Figure 6:
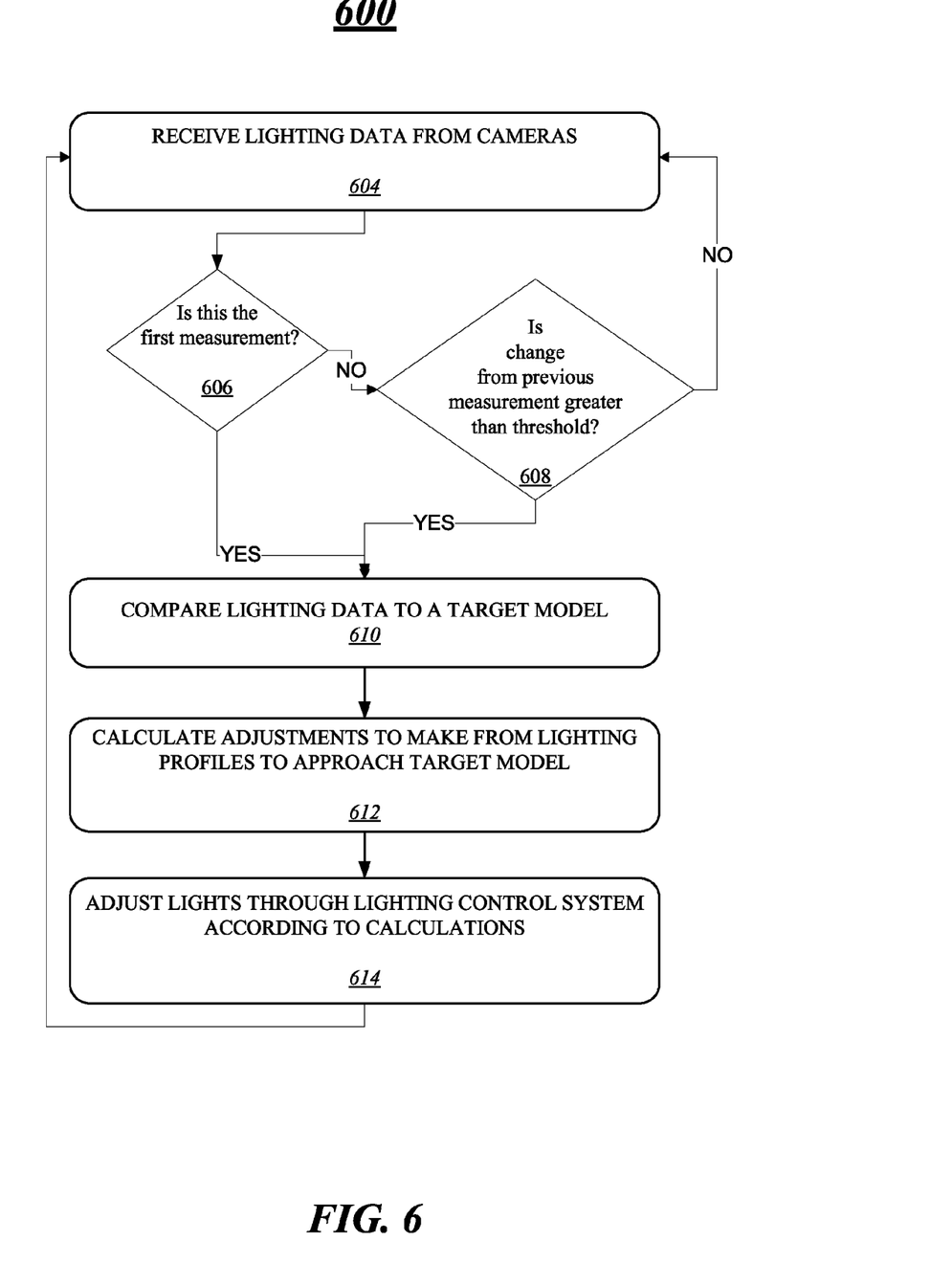
FIG. 6 illustrates an example of an active lighting control logic flow according to embodiments.

FIG. 6 illustrates one embodiment of a logic flow 600. The logic flow 600 may be representative of some or all of the operations executed by one or more embodiments described herein. Logic flow 600 may be directed to a method for active lighting control for a video teleconference. Logic flow 600 may take place generally at some time after the calibration process described in FIG. 5.

Logic flow 600 may receive lighting information from the cameras in the conference room in block 604. The information may be received directly from the cameras and/or from a video processing module. For example, lighting optimizing module (LOM) 340 may receive measurements for such lighting aspects as brightness, contrast, color warmth, and backlighting. LM 340 may further receive such measurements from the area of detected faces in the video scene. In an embodiment using multiple cameras, the information may be kept separate for each camera, or may be aggregated, such as by an average.

If the information received in block 604 is the first set of information for a VTC, in block 606, then logic flow 600 may compare the lighting data to a target model in block 610. A target model may include one or more lighting and video quality parameters that represent an optimal lighting solution for a video scene. Each parameter may have a value or a range of values assigned to it. Parameters may include, for example, brightness, contrast, color warmth, color balance, etc. LOM 340 may compare each parameter in the target model to the values measured and received in the lighting data. If one of the measured values does not match or fall within a range of values for the target model parameter, then one or more lights may need to be adjusted.

Logic flow 600 may calculate what adjustments to make to the room lights to approach the values of the target model. For example, LOM 340 may retrieve the room model 210 for the room in lighting control system 160. From the room model, LOM 340 may look up in lighting profiles 218 to determine the effects of each light in the room. For example, one light may increase brightness by 2.3 units, and make its area of effect 3% bluer. In an embodiment, LOM 340 may also use room layout 216 to select the lights that affect the area in the video scene. LOM 340 may calculate various possible combinations of turning lights on or off, based on the lighting profiles 218 to identify the light adjustments that will bring the lighting conditions closest to the target model. An embodiment of calculating the adjustments is described in more detail with respect to FIG. 7.

Logic flow 600 may adjust the lights in the room in block 614. For example, LOM 340 may communicate with lighting control system 160, using communication interface 230 to turn off/on the lights identified in block 612. LOM 340 may use control interface 220 to turn the lights on or off.

VTC device 140 may periodically monitor the lighting situation in the conference room. For example, VTC device 140 may measure the lighting parameters every second, every 10 seconds, every minute, or at some other desired interval. The periodic measurements may begin at block 604, and proceed through block 606 to block 608. At block 608, the current measurements may be compared to the previous measured values. If the change from the previous values to the current values is greater than some threshold at block 608, then the lights may be adjusted in blocks 610 through 614 as previously described.

Figure 7:
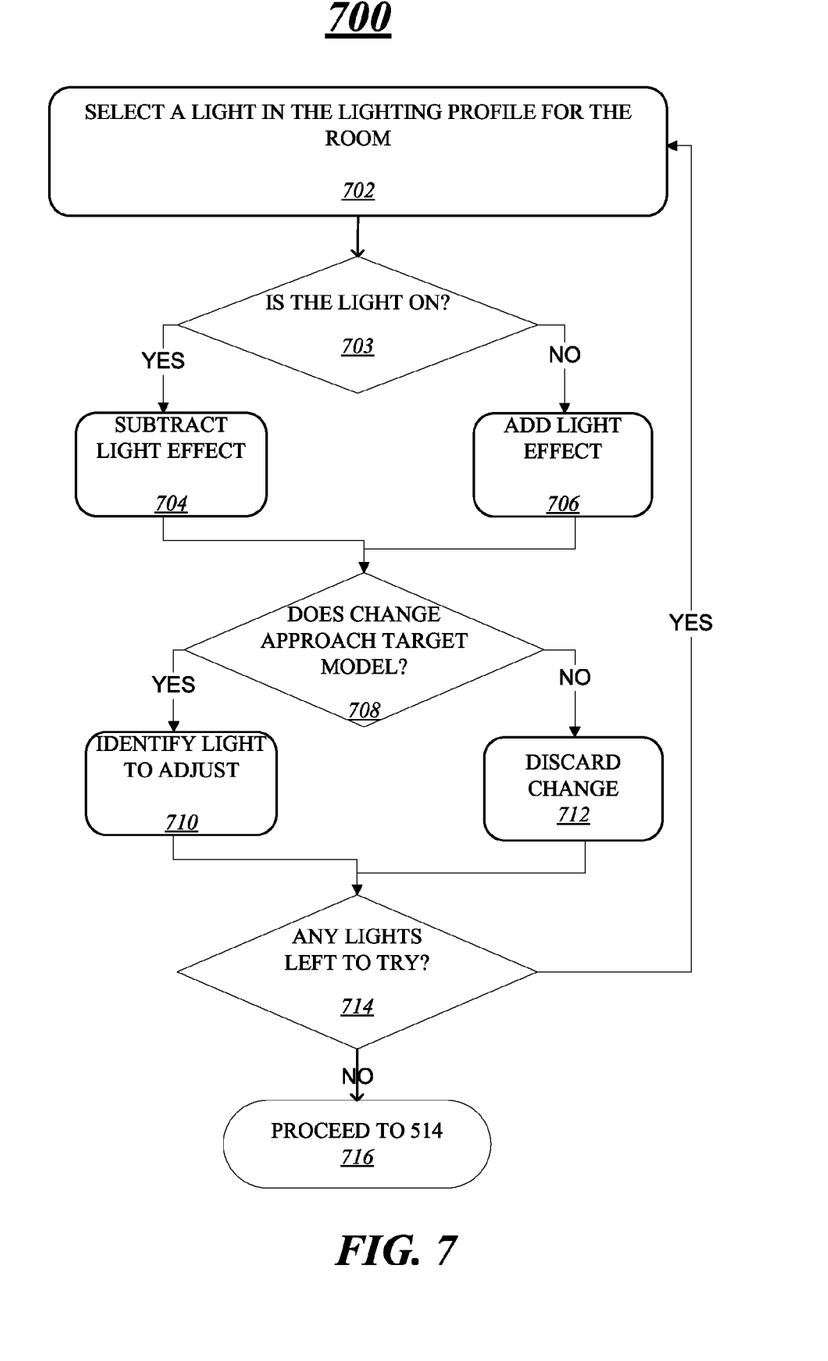
FIG. 7 illustrates an example of another logic flow according to embodiments.

FIG. 7 illustrates one embodiment of a logic flow 700. The logic flow 700 may be representative of some or all of the operations executed by one or more embodiments described herein. In particular, logic flow 700 may be an embodiment of calculating adjustments to lighting in block 612 from logic flow 600.

Logic flow 700 may select a light in the lighting profile in block 702. A light may be selected from a specified sequence, such as the ordering in the lighting profile. A light may be selected according to its placement in the room and the area of the room where the lighting needs to be adjusted. Referring to FIG. 4, if, for example the face of participant 418d is too dark with low contrast, LM 340 may first select light 410k, as it is the closest to the participant.

Logic flow 700 may, if the selected light is currently on in block 703, subtract the lighting profile of the selected light from the current condition in block 704, to estimate the effect of turning the light off. If the light is currently off, then logic flow 700 may add the lighting profile to the current condition in block 706 to estimate the effect of turning the light on. Other calculations may be performed, depending on the parameter. If, for example, a parameter increases logarithmically, then the log of the parameter may be added. The calculation in blocks 704 and 706 may be performed on a parameter by parameter basis. For example, the brightness value from the profile may be added to the measured brightness, the color value for blue from the profile may be added to the measured color value for blue, etc.

Logic flow 700 may compare the estimated change to the target model in block 708 and determine whether the estimated change is closer to the target model than the current measurements. If some parameters are brought closer to the target model and some are made farther away, then LOM 340 may prioritize the parameters. LOM 340 may calculate a score that reflects the overall improvement, or lack thereof, provided by all of a light's parameters, and may select the light that has the highest score.

If the change from block 708 approaches the target model in some way, then that light may be identified, in block 710, as one to adjust. If the change does not approach the target model, then, in block 712, the change from block 704 or 706 may be discarded.

If there are no further lights to try in block 714, then logic flow 700 may proceed to block 514, in block 716. If there are further lights to try, then logic flow 700 may repeat with a new light selection in block 702.

Logic flow 700 as illustrated may be one embodiment of the calculation from block 512. Other embodiments are possible. For example, in addition to testing the effects of individual lights, the effect of combinations of lights may be tested against the target model. Instead of proceeding to block 514 at block 716, the process may repeat for combinations of the lights identified in block 710. The embodiments are not limited to these examples.

Figure 8:
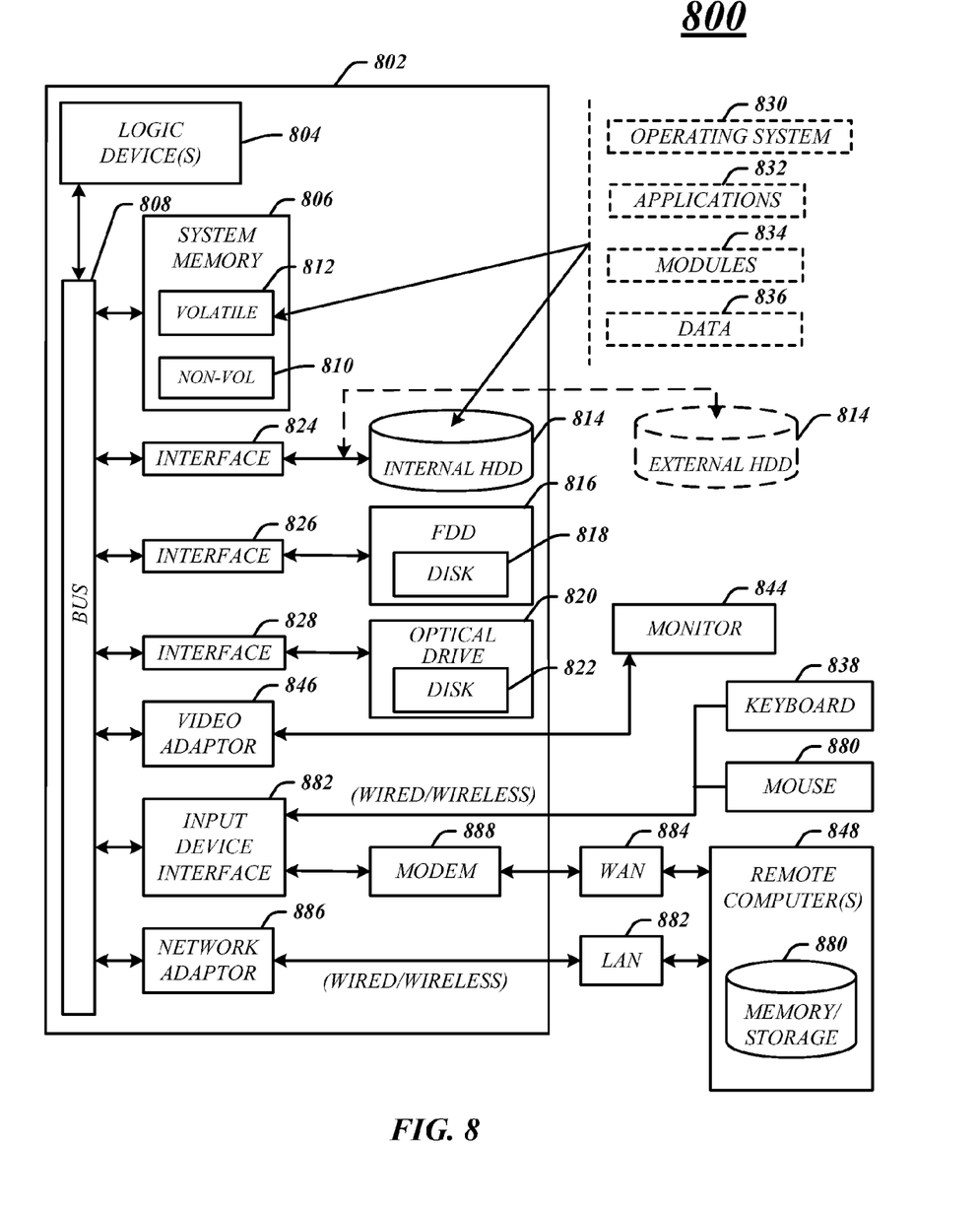
FIG. 8 illustrates an embodiment of a computing architecture.

FIG. 8 illustrates an embodiment of an exemplary computing architecture 800 suitable for implementing various embodiments as previously described. The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises logic device(s) 804, a system memory 806 and a system bus 808. Examples of a logic device may include, without limitation, a central processing unit (CPU), microcontroller, microprocessor, general purpose processor, dedicated processor, chip multiprocessor (CMP), media processor, digital signal processor (DSP), network processor, co-processor, input/output processor, application specific integrated circuit (ASIC), field programmable gate array (FPGA), programmable logic device (PLD), and so forth. Dual microprocessors and other multi-processor architectures may also be employed as the logic device(s) 804. The system bus 808 provides an interface for system components including, but not limited to, the system memory 806 to the logic device(s) 804. The system bus 808 can be any of several types of bus structure that may further interconnect to a memory bus (with or without a memory controller), a peripheral bus, and a local bus using any of a variety of commercially available bus architectures.

The system memory 806 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. The one or more application programs 832, other program modules 834, and program data 836 can include, for example, video conferencing module 320, video processing module 330, and lighting optimizing module 340.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the logic device(s) 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
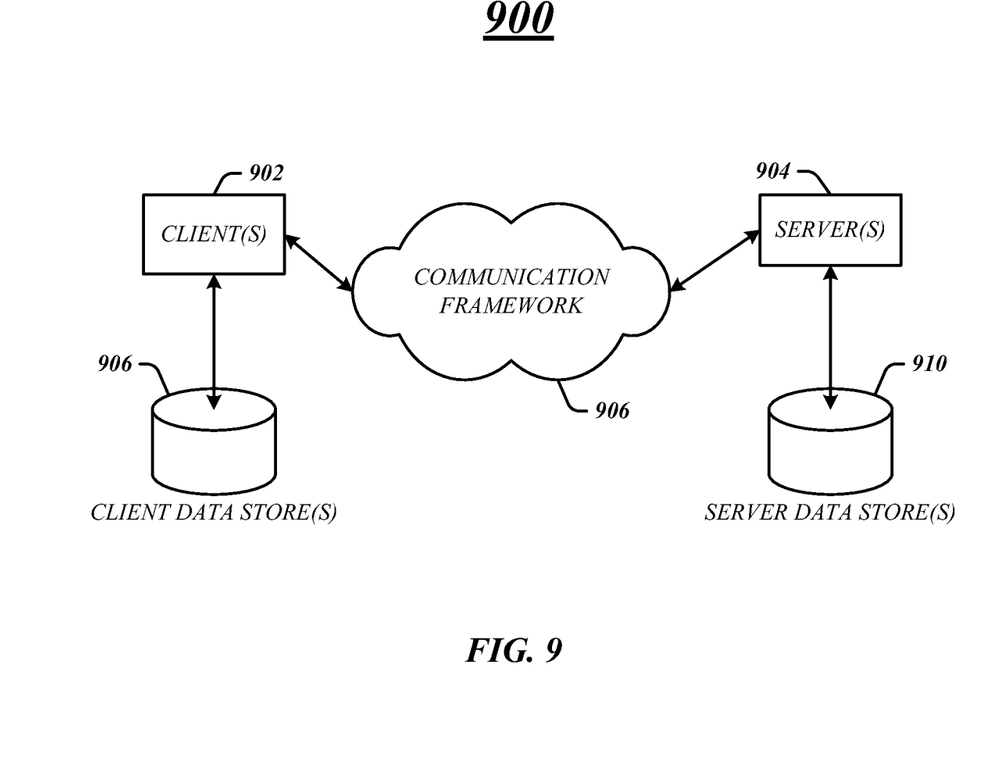
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the VTC device 140 or 300. The servers 904 may implement lighting control system 160 or 200. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 902 and the servers 904 may include various types of standard communication elements designed to be interoperable with the communications framework 906, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 902 and a server 904 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
    accessing a lighting control system to turn each light in a room on and off individually;
    measuring the effect on lighting data in the room when a light is off and when it is on;
    storing the measured effect in a lighting profile for the light;
    receiving lighting data from a video camera in the room;
    comparing the lighting data to a target model comprising a value for at least one parameter;
    calculating an adjustment to make to a light in the room when the lighting data is not within a specified range of the target model to approach the target model by:
        selecting a light and loading a lighting profile for the selected light;
        generating an estimated effect by subtracting the measured effect of the light being on from the lighting data, when the light is on in the room, or adding the measured effect of the light being on to the lighting data, when the light is off in the room;
        comparing the estimated effect to the target model; and
        selecting the light to adjust when the estimated effect is closer than the lighting data to the target model; and
    accessing a lighting control system to adjust the light according to the calculated adjustment.

2. The method of claim 1, wherein comparing the lighting data to the target model comprises:
    comparing the value of each parameter in the target model to a measured value for the parameter from the lighting data; and
    determining whether the measured value is within a specified range of the target model value.

3. The method of claim 1, further comprising:
    selecting a plurality of lights; and
    generating an estimated effect from a combination of turning one or more of the plurality of lights on or off.

4. The method of claim 1, further comprising:
    automatically detecting the room in which the video camera is operating; and
    loading a room profile for the detected room, the room profile comprising at least one of: a room identifier, room layout, a lighting profile, and an interface to the lighting control system.

5. The method of claim 4, wherein selecting a light comprises using the room layout to select a light in the vicinity of a source of the lighting data to be adjusted.

6. The method of claim 1, further comprising:
    periodically measuring the lighting in the room;
    determining if the difference between a new measurement and a previous measurement is greater than a threshold;

comparing the new measurement to the target model when the difference is greater than the threshold; and calculating and making an adjustment to a light in the room when the new measurement is not within a specified range of the target model.

7. The method of claim 1, further comprising:
receiving a detected face;
measuring a lighting condition on the face; and
optimizing lighting on the detected face by adjusting at least one light source in the room via the lighting control system.

8. An article comprising a storage medium containing instructions that when executed cause a system to:
access a lighting control system to turn each light in a room on and off individually;
measure the effect on lighting data in the room when the light is off and when it is on;
store the measured effect in a lighting profile for each light;
compare lighting data, received from a video camera in a room, to a target model comprising a value for at least one parameter;
calculate an adjustment to make to a light in the room when the lighting data is not within a specified range of the target model to approach the target model by:
  selecting a light in the room and loading a lighting profile for the selected light;
  estimating an effect by applying the measured effect of the light from the lighting profile to the lighting data according to whether the selected light is currently on;
  comparing the estimated effect to the target model; and
  selecting the light to adjust when the estimated effect is closer than the lighting data to the target model; and
access a lighting control system to adjust the light according to the calculated adjustment.

9. The article of claim 8, wherein the instructions to compare lighting data comprise instructions that when executed cause the system to:
compare the value of each parameter in the target model to a measured value for the parameter from the lighting data; and
determine whether the measured value is within a specified range of the target model value.

10. The article of claim 9, wherein the target model comprises a value or a range of values for at least one of: brightness, contrast, color warmth, and backlighting.

11. The article of claim 8, further comprising instructions that when executed cause the system to:
determine if the difference between a new measurement of lighting data and the previous lighting data is greater than a threshold;
compare the new measurement to the target model when the difference is greater than the threshold; and
calculate an adjustment to a light in the room when the new measurement is not within a specified range of the target model.

12. An apparatus, comprising:
a logic device;
a communication interface to communicate with a lighting control system;
a lighting optimizing module operating on the logic device to:
  generate a lighting profile for an individually controllable light source by:
    measuring the effect on lighting in the room when the individually controllable light source is off and when it is on; and
    storing the measured effect in a lighting profile for each individually controllable light source;
  receive lighting data from a video camera in a room, the lighting data comprising at least one parameter;
  compare the lighting data to an target model comprising a target value for the at least one parameter;
calculate an adjustment to make to a light source in the room to approach the target model by:
  selecting an individually controllable light source and loading a lighting profile for the selected light source;
  generating an estimated effect by subtracting the measured effect of the light being on from the lighting data when the light is on in the room or adding the measured effect of the light being on to the lighting data when the light is off in the room;
  comparing the estimated effect to the target model; and
  selecting the light to adjust when the estimated effect is closer than the lighting data to the target model; and
access the lighting control system via the communication interface to adjust the at least one light source in the room.

13. The apparatus of claim 12, further comprising:
a video conferencing module to:
transmit video and audio information from the room to other video conferencing modules located in other rooms;
receive video and audio information from the other video conferencing modules; and
display the received video and audio information.

14. The apparatus of claim 12, further comprising:
a video processing module to:
receive the video information from the video camera;
detect faces of participants in the room;
measure lighting information on the faces; and
provide the measured lighting information to the lighting optimizing module as the lighting data.

* * * * *